(12) United States Patent
Plattner

(10) Patent No.: US 6,454,210 B1
(45) Date of Patent: Sep. 24, 2002

(54) AIRCRAFT VENT AND CARGO DOOR LOCKING MECHANISM

(76) Inventor: Wesley M. Plattner, 1146 Breyman Hwy., Tipton, MI (US) 48287

( * ) Notice: Subject to any disclaimer, the term of this patent is extended or adjusted under 35 U.S.C. 154(b) by 67 days.

(21) Appl. No.: 09/645,184

(22) Filed: Aug. 24, 2000

Related U.S. Application Data

(60) Provisional application No. 60/218,638, filed on Jul. 13, 2000.

(51) Int. Cl.[7] .................................................. B64C 1/14
(52) U.S. Cl. .................................................. 244/129.5
(58) Field of Search ........................... 244/129.4, 129.5; 49/276, 278

(56) References Cited

U.S. PATENT DOCUMENTS

| | | | |
|---|---|---|---|
| 3,085,297 A | | 4/1963 | Linderfelt |
| 3,647,169 A | | 3/1972 | Allwright et al. |
| 4,262,495 A | * | 4/1981 | Gupta et al. ................... 62/172 |
| 4,463,774 A | * | 8/1984 | Gorges et al. ............... 137/238 |
| 4,473,201 A | | 9/1984 | Barnes et al. |
| 4,497,462 A | | 2/1985 | Hamatani |
| 4,510,714 A | * | 4/1985 | Kasper et al. ........... 244/129.5 |
| 4,552,326 A | | 11/1985 | Bokalot |
| 4,680,891 A | * | 7/1987 | Perkins ..................... 244/129.5 |
| 4,720,065 A | * | 1/1988 | Hamatani ................. 244/129.5 |
| 4,991,795 A | | 2/1991 | Koncsek |
| 5,273,486 A | * | 12/1993 | Emmons et al. ............... 454/74 |
| 5,275,361 A | * | 1/1994 | Fray ........................ 244/118.1 |
| 5,305,969 A | | 4/1994 | Odell et al. |
| 5,337,977 A | | 8/1994 | Fleming et al. |
| 5,480,109 A | * | 1/1996 | Klein et al. ............... 244/129.5 |
| 5,823,473 A | * | 10/1998 | Odell et al. ............... 244/129.5 |
| 6,019,315 A | * | 2/2000 | Scherer et al. ........... 244/129.1 |

* cited by examiner

Primary Examiner—Charles T. Jordan
Assistant Examiner—Kevin Jakel
(74) Attorney, Agent, or Firm—Young & Basile, P.C.

(57) ABSTRACT

An aircraft vent and cargo door locking mechanism for ensuring the opening, closing, and locking of a cargo door in a cargo door opening formed in an aircraft fuselage. A latch assembly latches the cargo door to the fuselage, and the latch assembly moves between a latched position, wherein the cargo door is closed, and an unlatched position, wherein the cargo door may be opened. A locking assembly locks the latch assembly by moving between a locked position, wherein the latch assembly is maintained in the latched position, and an unlocked position, wherein the latch assembly may move to the unlatched position. A blocker provides a secondary locking mechanism by being slideably connected to the cargo door for movement between a blocked position, wherein the blocker engages and prohibits the locking and latch assemblies from moving to the unlocked and unlatched positions, respectively, and an unblocked position, wherein the blocker is disengaged from the locking and latch assemblies allowing the blocking and latch assemblies to move to the unlocked and unlatched positions, respectively. An actuator is operatively connected to the blocker for actuating the blocker between the blocked and unblocked positions. A vent door is mounted adjacent an opening provided in the aircraft fuselage wherein the opening and the vent door are remote from the cargo door. The actuator is operatively connected to the vent door for actuating the vent door between a vent door closed position and a vent door open position simultaneously with the actuation of the blocker.

24 Claims, 5 Drawing Sheets

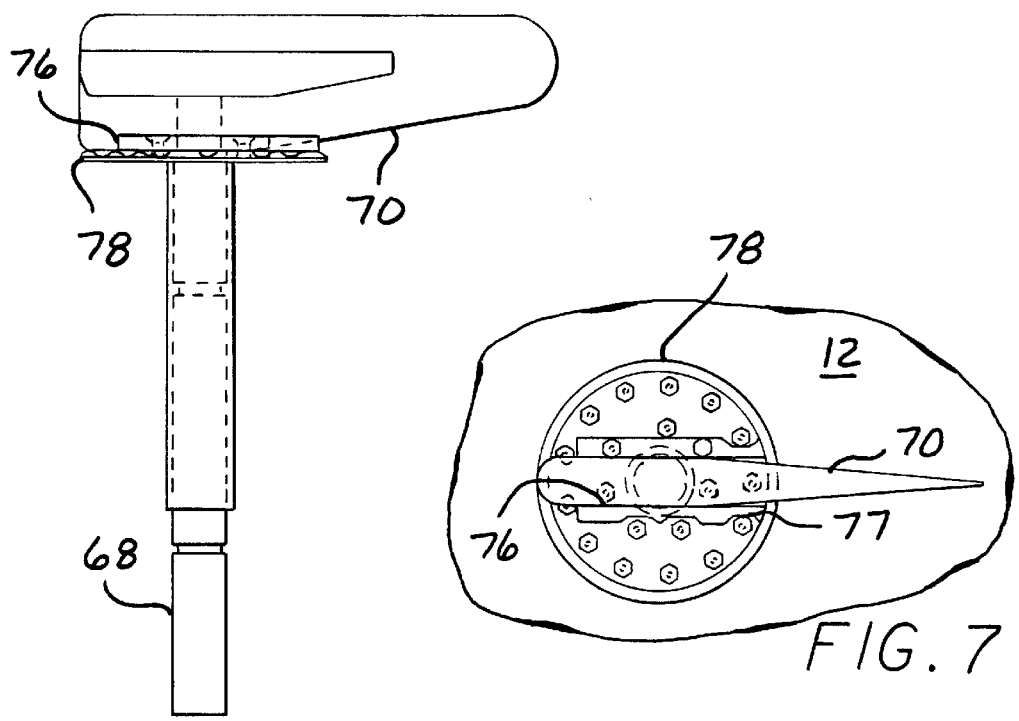
FIG. 6
FIG. 7
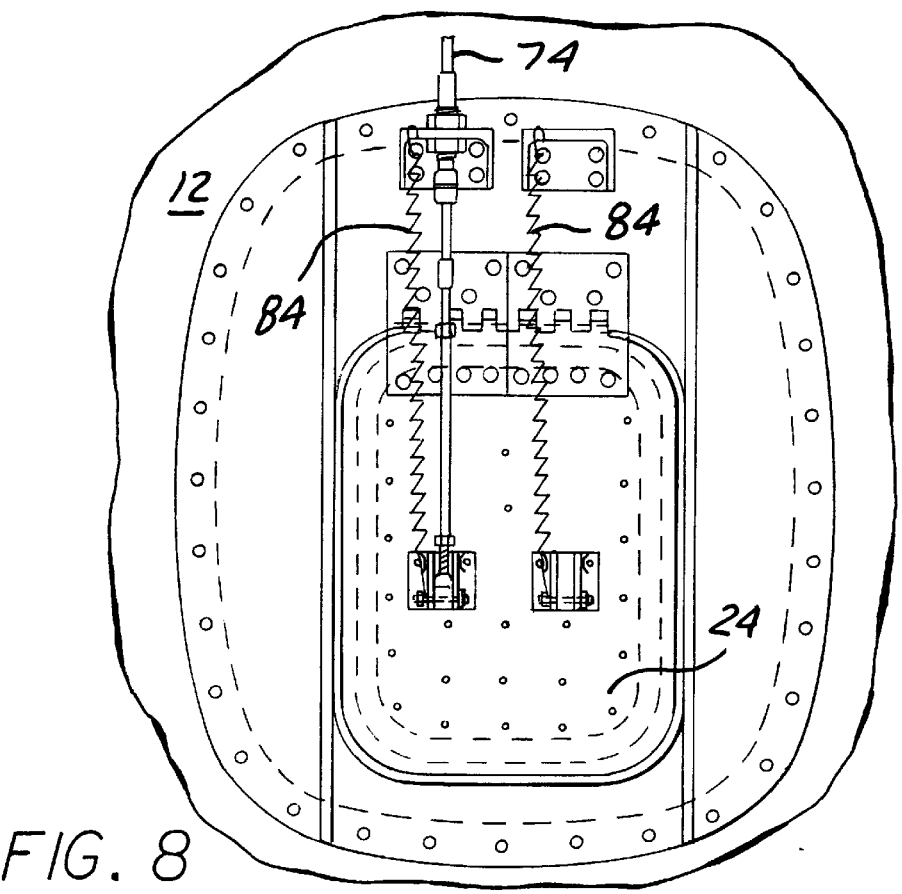
FIG. 8

AIRCRAFT VENT AND CARGO DOOR LOCKING MECHANISM

This application claims the benefit of provisional application No. 60/218,638, filed Jul. 13, 2000.

FIELD OF THE INVENTION

The invention relates to aircraft cargo doors and vents, and more particularly, to an aircraft vent and cargo door locking mechanism that provides for the opening, closing, and locking of an aircraft cargo door and vent door.

BACKGROUND OF THE INVENTION

The doors of modern commercial aircraft are often provided with vent-latch interlock assemblies. A typical vent-latch interlock assembly includes a small pressure vent door that is seated in an opening formed in the aircraft cabin door. A drive linkage is connected between the pressure vent door and a latch assembly that controls the opening, closing, and locking of the aircraft cabin door. The drive linkage is arranged so that it will not close the pressure vent door until the associated aircraft cabin door is latched and locked. Consequently, in the event the aircraft cabin door is not properly closed, the open pressure vent door prevents the aircraft from being pressurized, thus requiring aircraft personnel to take note that there is a problem with the cabin door that requires attention. Moreover, a typical drive linkage is arranged so that, before the latch assembly is actuated to open the aircraft cabin door, the pressure vent door is initially opened. The pressure vent door and the drive linkage are further constructed so that, when the aircraft's cabin pressure is greater than the ambient pressure, the pressure vent door will not open, and the drive linkage will not move. Since the drive linkage is integrally connected to the latch assembly, this "lock-out" of the drive linkage prevents the actuation of the latch assembly and the unlocking and opening of the aircraft door. Thus, a pressure vent door assembly is well-suited for installation to an aircraft cabin door to prevent the door from being opened while the aircraft is in pressurized flight. The pressure vent door and the drive linkage are further configured so that, in the event that the ambient pressure is substantially greater than the aircraft cabin pressure, the pressure vent door will open. This allows air to bleed into the aircraft to reduce the pressure differential between the inside of the aircraft and the ambient environment. The minimization of this pressure differential reduces the force imposed on the aircraft by the surrounding atmosphere.

Although current and more modern commercial aircraft are typically equipped with such vent-latch assemblies, many of the older commercial aircraft are not. Thus, it has become necessary to modify older commercial aircraft with the installation of vent-latch assemblies. One such area in the aircraft industry that typically utilizes older aircraft and requires the retrofitting installation of vent-latch assemblies is commercial cargo aircraft.

Commercial cargo aircraft provide unique concerns and design considerations over passenger aircraft in that cargo aircraft provide a large cargo door provided in the side of the fuselage. These cargo doors typically have their own latching mechanisms that are not tied into a vent-latch system. Since the cargo doors of cargo aircraft typically do not contain windows or openings therein, a vent-latch assembly similar to those provided in cabin doors of passenger aircraft cannot be installed within the cargo doors. To modify the cargo doors by cutting a vent door opening in the cargo door raises too many structural and design concerns that are beyond the scope and cost of the modifications to the cargo aircraft. In addition, due to the size of the cargo doors and the loads that the cargo aircraft carry, the cargo doors often require a secondary locking system or backup locking mechanism to prevent the cargo door from unwantedly opening.

Thus, it would be desirable to provide an aircraft vent and cargo door locking mechanism that provides for the opening, closing, and locking of a cargo door and vent door while not affecting the structural integrity of the cargo door. In addition, it would be desirable to provide an aircraft vent and cargo door locking mechanism that provides a secondary locking system or back-up locking mechanism. It would also be desirable to provide an aircraft vent and cargo door locking mechanism that is simple, inexpensive, reliable, and easy to maintain.

SUMMARY OF THE INVENTION

The present invention provides an aircraft vent and cargo door locking mechanism for ensuring the opening, closing, and locking of a cargo door in a cargo door opening formed in an aircraft fuselage. The invention provides a latch assembly for latching the cargo door to the fuselage. The latch assembly is connected to the fuselage and the cargo door for movement between a latched position, wherein the cargo door is in a closed position, and an unlatched position, wherein the cargo door may move to an open position. A locking assembly is connected to the cargo door for movement between a locked position, wherein the latch assembly is maintained in the latched position, and an unlocked position, wherein the latch assembly may move to the open position. A blocker assembly is connected to the cargo door for movement between a blocked position, wherein the blocking assembly engages and prohibits the locking and latch assemblies from moving to the unlocked and unlatched positions, respectively, and an unblocked position, wherein the blocking assembly is disengaged from the locking and latch assemblies, allowing said locking and latch assemblies to move to said unlocked and unlatched positions, respectively. An actuator is operatively coupled to the blocker assembly for actuating the blocker assembly between the blocked and unblocked position. A vent door is mounted adjacent an opening provided in the aircraft fuselage wherein the opening and the vent door are remote from the cargo door. The vent door is movable between a vent door closed position, wherein the adjacent opening is sealedly closed, and a vent door open position, wherein the adjacent opening is open. A biasing means biases the vent door towards the vent door open position. The actuator is also operatively coupled to the vent door to actuate the vent door between the vent door closed position and the vent door open position simultaneously with the actuation of the blocker assembly between the blocked and unblocked positions, respectively.

The latch assembly comprises a plurality of latches adjacently mounted along one side of the cargo door and an opposing surface of the fuselage. A torque tube is rotatably connected to the cargo door and operatively connected to each of the plurality of latches. A rotating means rotates the torque tube thus simultaneously actuating the latches between the latched position and the unlatched position.

The locking assembly comprises a gang bar pivotally mounted for movement between the locked position and the unlocked position. A plurality of swivel arm assemblies are pivotally connected to the gang bar and operatively connected to the plurality of latches. A moving means slides the gang bar between the locked and unlocked positions wherein the swivel arm assemblies move with the gang bar to lock and unlock the plurality of latches. Electronic sensors are mounted on the cargo door to indicate whether the gang bar is in the locked or unlocked position. A pair of lock blocks are connected to the gang bar, and the blocker assembly engages the lock blocks to ensure that the gang bar does not slide to the unlocked position.

The actuator provides a handle pivotally mounted to the cargo door. The handle may extend to both the interior and the exterior of the fuselage. At least one first push/pull cable is operatively connected to the handle and is operatively connected to the blocker assembly for moving the blocker assembly between the blocked and unblocked position in response to the rotation of the handle. A second push/pull cable is operatively connected to the handle and operatively connected to the vent door for moving the vent door between the vent door closed and open positions in response to rotation of the handle.

BRIEF DESCRIPTION OF THE DRAWINGS

The description herein makes reference to the accompanying drawings wherein like referenced numerals refer to like parts throughout the several views wherein:

FIG. 6 is a front view of the vent door of the present invention.

FIG. 7 is a front view of the exterior handle of the present invention.

FIG. 8 is a top view of the exterior handle of the present invention.

DESCRIPTION OF THE PREFERRED EMBODIMENT

Figure 1:
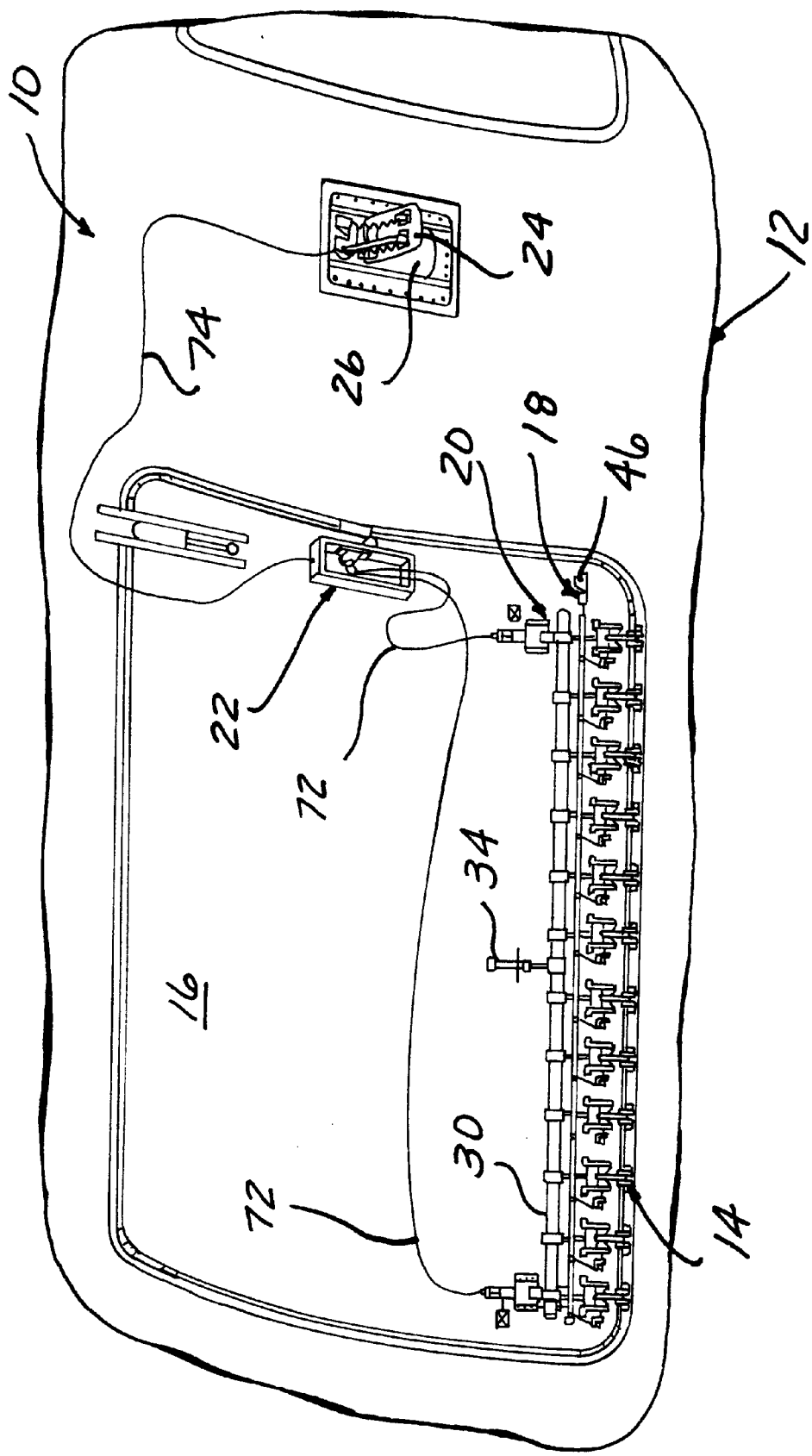
FIG. 1 is a perspective view of the present invention installed in the fuselage of a cargo aircraft.
Figure 3:
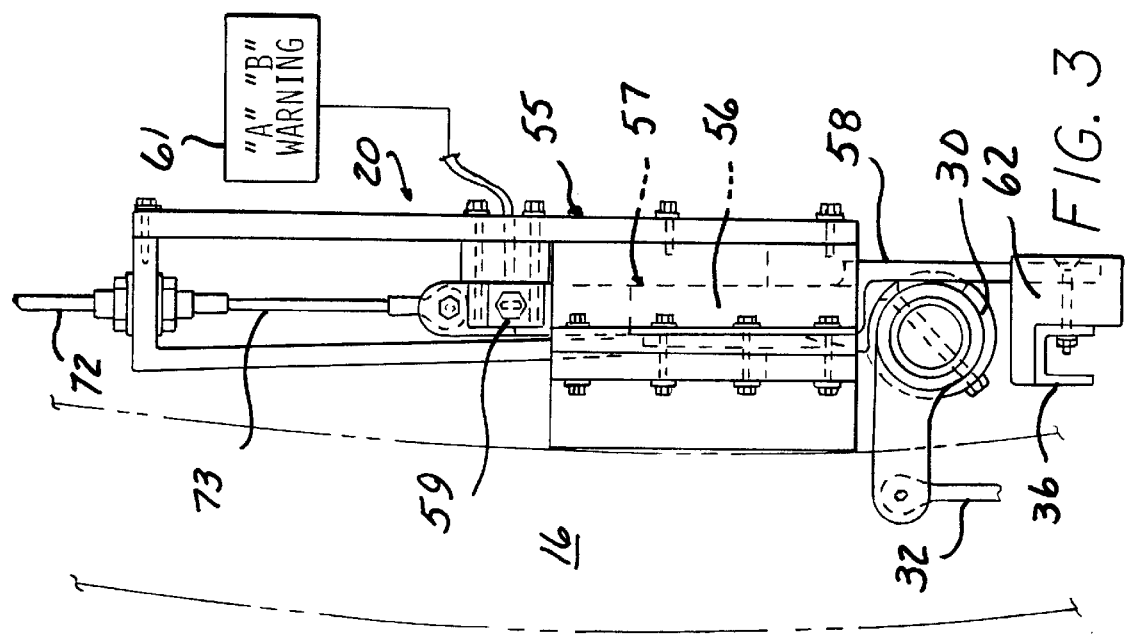
FIG. 3 is a side view showing the blocker assembly of the present invention.
Figure 2:
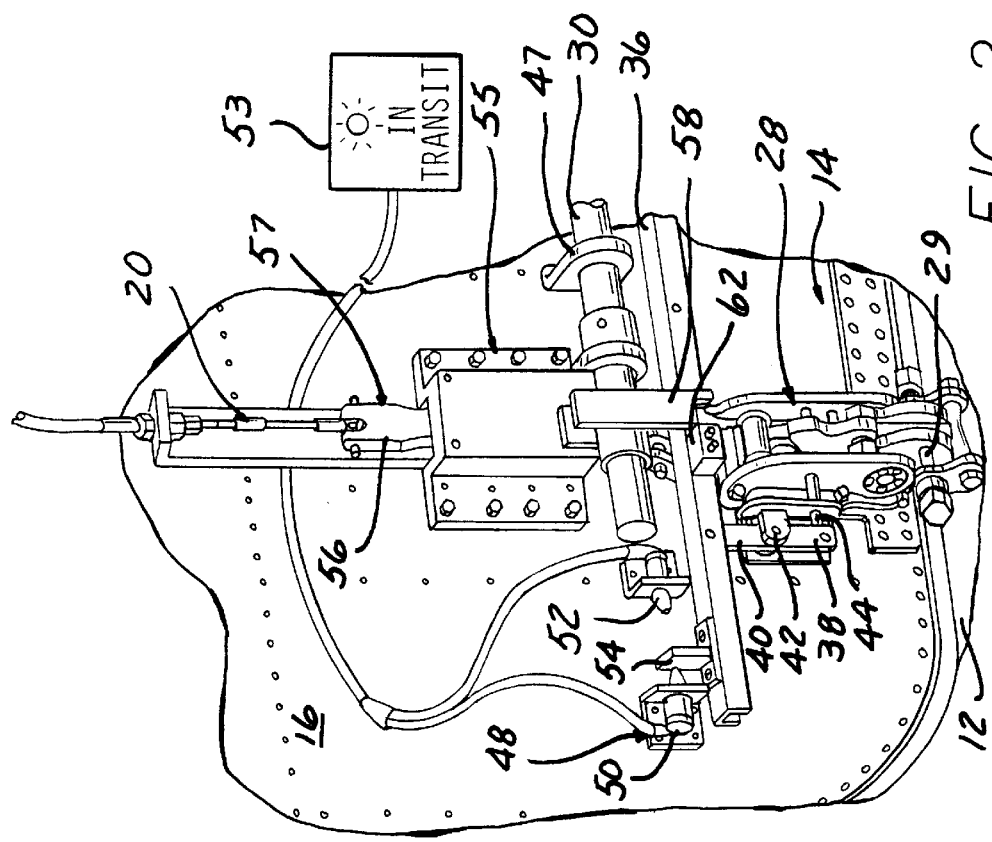
FIG. 2 is a perspective view showing the latch assembly, locking assembly, and blocker assembly of the present invention.
Figure 4:
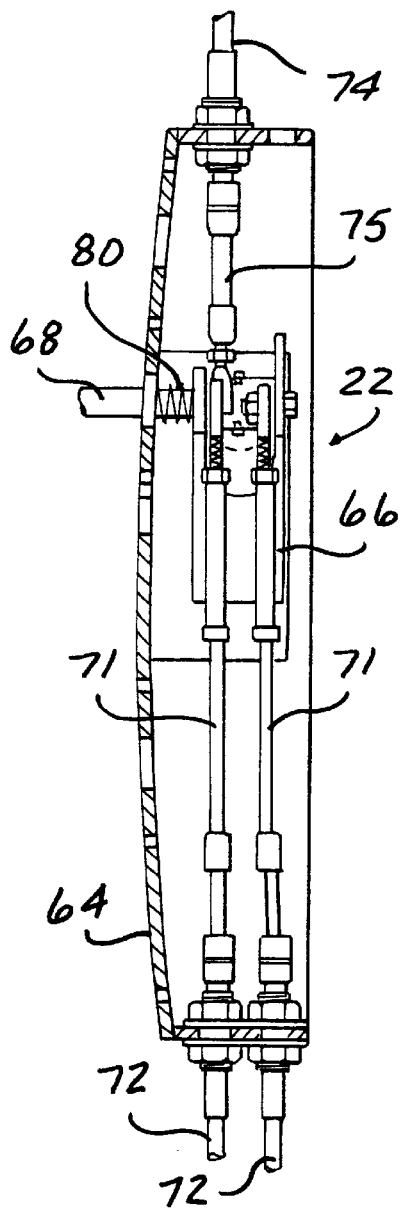
FIG. 4 is a front view of the actuator of the present invention.
Figure 5:
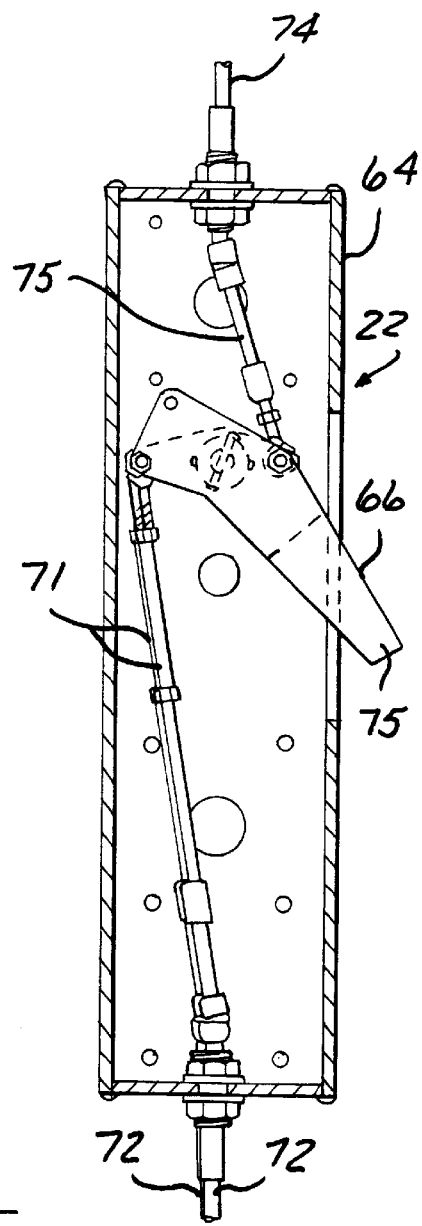
FIG. 5 is a side view of the actuator of the present invention.
Figure 9:
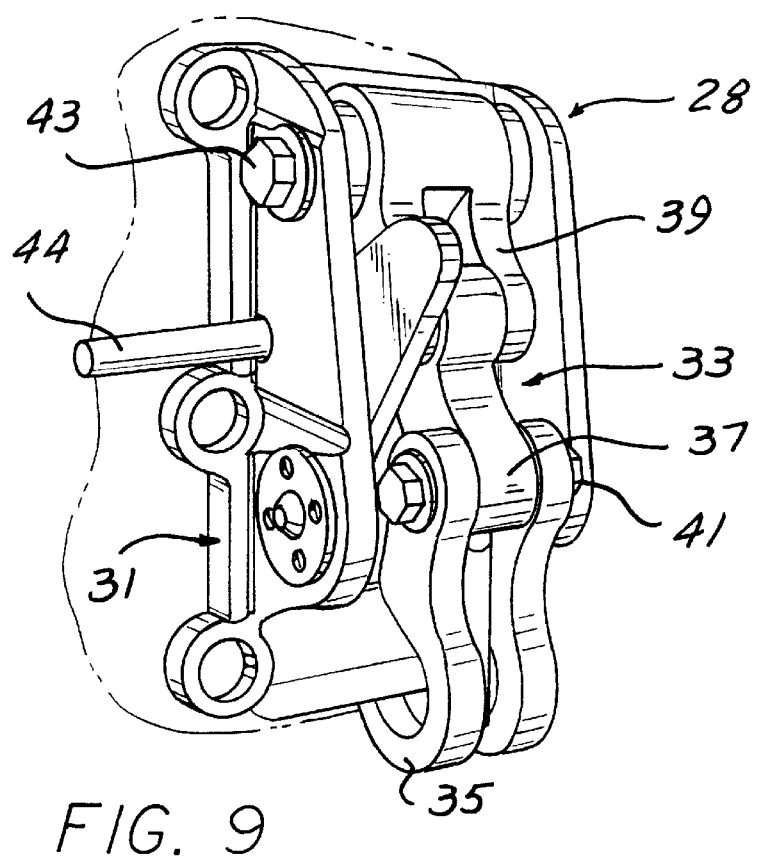
FIG. 9 is a perspective view of a latch of the present invention.
Figure 10:
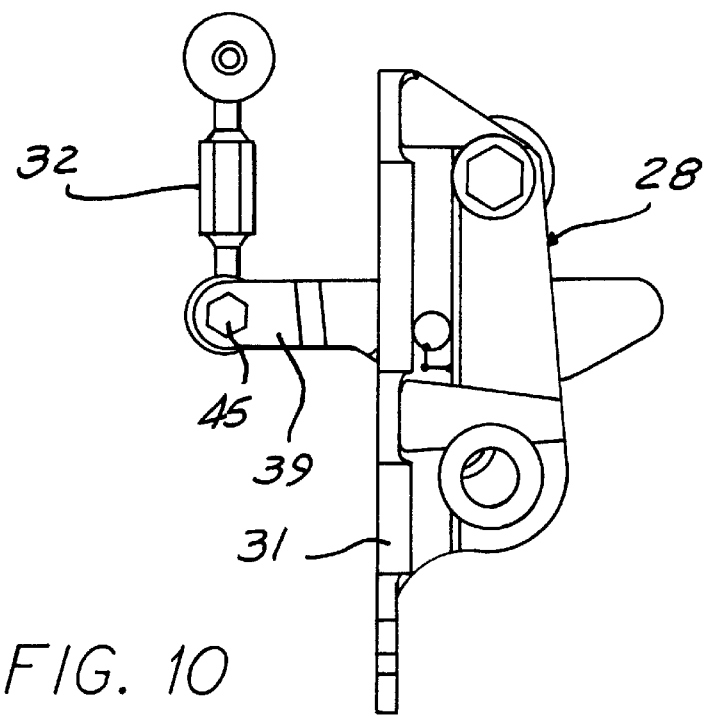
FIG. 10 is a side view of a latch of the present invention.

FIG. 1 illustrates an aircraft vent and cargo door locking mechanism 10 as defined in the present invention. The mechanism 10 is installed in a fuselage 12 of a cargo aircraft. The mechanism 10 provides a latch assembly 14 for latching a cargo door 16 to the fuselage 12 of the cargo aircraft. A locking assembly 18 locks the latch assembly 14 into a latched position. A blocker assembly 20 provides a secondary locking system by prohibiting the primary locking system 18 from becoming unlocked and prohibiting the latch assembly 14 from becoming unlatched. An actuator 22 is operatively connected to the blocker assembly 20 for moving the blocker assembly 20 into engagement with the locking system 18 and the latch assembly 14. The actuator 22 is also operatively connected to a vent door 24. The actuator 22 actuates the vent door 24 between a vent door open position and a vent door closed position with respect to an adjacent opening 26 provided in the fuselage 12 of the cargo aircraft.

To latch the cargo door 16 to the fuselage 12 of the cargo aircraft, the latch assembly 14 preferably provides twelve latches 28 adjacently mounted along an opening end of the cargo door 16. It should be noted that the present invention is not limited to twelve latches 28, but rather, any number of latches may be utilized as long as there are enough latches to safely secure the cargo door 16 in the closed position. As seen in FIGS. 1–3, 9 and 10, the latches 28 engage cylinders 29 that are adjacently mounted on the fuselage 12 adjacent the opening for the cargo door 16. The latches 28 are conventional latches that have been modified to complement the locking assembly 18, as will be described in detail later. Each latch 28 provides a base 31 connected to the cargo door 16 by fasteners. The base 31 supports a pivotal linkage assembly 33 having a hook 35 for engaging cylinder 29. The hook 35 is pivotally connected to a first link 37 by a pivot pin 14, and the first link 37 is also pivotally connected to a second link 39 by a pivot pin (not shown). The second link 39 is connected to the base 31 by a pivot pin 43. The second link 39 extends rearwardly outward from the base 31 of the latch 28 and is pivotally connected to a tie rod 32 by a pivot pin 45 wherein tie rod 32 is connected to a torque tube 30. The torque tube 30 is rotatably supported by brackets 47 that are connected to the cargo door 16. A linear actuator or hydraulic cylinder 34 is operatively connected to the torque tube 30. A plurality of tie rods 32 extend from the torque tube 30 to each of the latches 28. The linear actuator or hydraulic cylinder 34 is mounted to the cargo door 16 and reciprocally rotates the torque tube 30 between the latched and unlatched positions. The rotation of the torque tube 30 lifts and lowers the attached tie rods 32 which, in turn, latches and unlatches each of the latches 28.

To prohibit the latches 28 from becoming unwantingly unlatched, the locking assembly 18 provides a gang bar 36 having twelve swivel arm assemblies 38 connected thereto and corresponding to the twelve latches 28. The number of swivel arm assemblies 38 corresponds to the number of latches 28. Each of the swivel arm assemblies 38 provides an arm 40 that is pivotally connected to the gang bar 36 and pivotally connected to a bracket 42 mounted to the cargo door 16 adjacent the latch 28. A locking pin 44 is pivotally connected to the end of each arm 40. The locking pin 44 is inserted through an aperture provided in the bracket 42 and received by an aperture provided in the second link 39 of latch 28 when the latch 28 is in the latched position. The latch 28 cannot receive the locking pin 44 when in the unlatched position due to the misalignment of the apertures provided in the bracket 42 and the second link 39. When in the latched position, the apertures are aligned, and the locking pin 44 may be inserted through the second link 39 to prohibit the latch 28 from becoming unlatched. Movement of the locking pin 44 is dictated by gang bar 36 which moves horizontally (forward and aft) by a linear actuator or hydraulic cylinder 46 that is mounted to the cargo door 16 and operatively connected to gang bar 36. When the gang bar 36 is extended away from hydraulic cylinder 46 (aft), the arms 40 pivot and the locking pins 44 engage and prohibit the latches 28 from becoming unlatched. When gang bar 36 is retracted toward the hydraulic cylinder 46 (forward), the locking pins 44 are withdrawn from latches 28, and the latches 28 may become unlatched.

Mechanism 10 also provides an indicator 48 for determining whether the locking assembly 18 is in a locked or unlocked position. The indicator 48 provides two limit switches or electronic sensors 50, 52 which are adjacently and opposedly mounted to the cargo door 16. The limit switches 50, 52 are located just above the gang bar 36 with a certain amount of space between the ends of the limit switches 50, 52. A block 54 is mounted on the end of the gang bar 36 and between the ends of the limit switches 50, 52 so as to travel between the ends of the limit switches 50, 52. When the gang bar 36 is retracted (forward) in the unlocked position, limit switch 52 is engaged by block 54, and a signal is sent to a visual indicator, such as an "in transit" light 53, indicating that the locking assembly 18 is in an unlocked position. When the gang bar 36 is in the extended (aft) or locked position, the block 54 engages limit switch 50, and a signal is sent to extinguish the "In Transit" light 53, thus indicating that the locking assembly 18 is in the locked position.

As a secondary locking system, the blocker assembly 20 prevents the locking assembly 18 from becoming unwantingly unlocked and prevents the latch assembly 14 from becoming unwantingly unlatched. The blocker assembly 20 provides a pair of housings or brackets 55 connected to the cargo door 16 and mounted just above both ends of the torque tube 30. Each housing or bracket 55 provides a blocker 57 that is slideably mounted within the housing or bracket 55. Preferably, the blocker 57 is fabricated from a metallic bar having two substantially 90° bends to form a first portion 56 that is forward of and integral with a second portion 58, but alternatively, the blockers may also be straight. The first portion 56 of the blocker 57 engages a lock block 62 formed on each end of the gang bar 36 when the latch assembly 14 is in the latched position. The lock blocks 62 extend integral with and inboard from the gang bar 30. The lock blocks 62 engage or are directly adjacent the first portion 56 of the blockers 57 when in the latched position thus preventing the lock blocks 62 and gang bar 36 from retracting (forward) toward the unlatched position. When the blockers 57 are raised, the lock blocks 62 are free to retract (forward) with the gang bar 36 toward the unlatched position. A sufficient clearance is provided between the lock blocks 62 and the second portion 58 of the blockers 57 to allow for retraction of the lock blocks 62 toward the unlatched position. However, when the lock blocks 62 have retracted toward the unlatched position, the blockers 57 are prevented from moving to the latched position due to the interference created by the lock blocks 62.

A limit switch 59 is mounted within each bracket or housing 55 to indicate whether the blockers 57 are in the blocked or unblocked position. The blockers 57 provide a recessed portion so that the blockers 57 engage the limit switches 59 when in the blocked position but do not engage the limit switches 59 when in the unblocked position. When the limit switches 59 are disengaged, an "A" and "B" "warning" light 61 are extinguished to indicate to the user that the secondary locks are in place and the vent door 24 is closed.

To move the blockers 57, the actuator 22 actuates the blockers 57 between a blocked position and an unblocked position. As seen in FIGS. 1 and 3–8, the actuator 22 provides a substantially rectangular housing 64 mounted to the cargo door 16. An interior lever or handle 66 is mounted to a rod or cylinder 68 that extends through to the exterior side of the fuselage 12. An exterior lever or handle 70 is connected to the end of the rod or cylinder 68 that extends outward from the fuselage 12. The interior lever or handle 66 is pivotally connected to at least one rod 71 which in turn is connected to a conventional push/pull cable 72. Preferably, there are two rods 71 and push/pull cables 72 that extend downward through the bottom of the housing 64. Each of the push/pull cables 72 extends to a blocker assembly 20 wherein each push/pull cable 72 is connected to a rod 73 which in turn is pivotally connected to one of the blockers 57. The interior lever or handle 66 also has another rod 75 pivotally connected to the handle 66 at a point diametrically opposed from the pivotal connections of rod 71. The rod 75 is connected to a conventional push/pull cable 74 which extends through the top of the housing 64 and along the top of the cargo door 16 and fuselage 12, and is operatively connected to the vent door 24. The interior lever or handle 66 extends outward from the side of the housing 64 and provides a portion 75 for which a user may grasp and rotate the handle 66 between the locked position and the unlocked position. The portion of the handle 66 extending outwardly from the housing 64 may provide a visual indicator on the handle 66, such as a colored or written indicator, or on the cargo door 16, such as a written position indicator, as to whether the handle 66 is in a locked or unlocked position.

The exterior lever or handle 70 also provides a method by which a user may move the mechanism 10 between the unlocked and locked positions from outside the fuselage 12. The exterior lever 70 provides a thin rectangular bar 77 which rests or is captured within a slot 76 provided in a substantially circular plate 78 mounted on the outside of the fuselage 12. A compression spring 80 is mounted on the cylinder 68 between the interior side of the fuselage 12 and the interior handle 66. This provides a spring bias for maintaining the exterior handle 70 in the slot 76 of the plate 78. When a user wishes to rotate the exterior handle 70, the exterior handle 70 may be pulled outward against the spring bias and away from the fuselage 12 so as to disengage the exterior handle 70 from the slot 76 of the plate 78. The exterior handle 70 may then be turned to the unlocked position. A visual indicator may be provided on the outside of the fuselage 12 to indicate to the user that when the exterior handle 70 is seated in the slot 76 of the plate 78, the mechanism 10 is in the locked position, and when the exterior handle 70 is removed from the slot 76, the mechanism 10 is in an unlocked position.

To provide a vent for mechanism 10, the vent door 24 is installed in a window opening of the fuselage 12 wherein the window (not shown) has been removed. As seen in FIGS. 1 and 8, the vent door 24 is hingedly mounted to the fuselage 12 just above the top of the opening 26 to allow the vent door 24 to sealingly close opening 26. Push/pull cable 74 is pivotally attached to the vent door 24 for moving the vent door 24 between the vent door closed position and the vent door open position. A pair of tension springs 84 have their ends connected to the fuselage 12 and the vent door 24 to bias the vent door 24 toward the vent door open position. Push/pull cable 74 actuates the vent door 24 through the turning of either the interior handle 66 or the exterior handle 70.

In operation, the cargo door 16 is closed, and the latches 28 of the latch assembly 14 are latched by the actuation of hydraulic cylinder 34. Hydraulic cylinder 36 is then actuated to move the gang bar 36 to a position wherein the locking pins 44 lock the latches 28 and prevent the latches 28 from becoming unlatched. The limit switch 50 is engaged by the gang bar 36 thus extinguishing the "In Transit" light. Once the "In Transit" light is extinguished, the user knows he/she may close the vent door 24. The user then rotates the interior handle 66 or the exterior handle 70 of the actuator 22 to move the mechanism 10 into the secondary locking position. By doing so, push/pull cable 72 actuates the blockers 57 to the blocked position so that the gang bar 36 is prohibited from moving forward to the unlocked position, and the torque tube 30 is prohibited from rotating toward the unlatched position. In addition, push/pull cable 74 actuates the vent door 24 into the vent door closed position. The blockers 57 engage limit switches 59 and extinguish the "A" and "B" "warning"0 lights to indicate to the user that the aircraft is ready for pressurization.

While the invention has been described in connection with what is presently considered the most practical and preferred embodiment, it is to be understood that the invention is not to be limited to the disclosed embodiments, but on the contrary, it is intended to cover various modifications and equivalent arrangements included within the spirit and scope of the appended claims which scope is to be accorded the broadest interpretation so as to encompass all such modifications and equivalent structures as is permitted under the law.

What is claimed is:

1. An aircraft vent and cargo door locking mechanism for ensuring the opening, closing, and locking of a cargo door in a cargo door opening formed in an aircraft fuselage, comprising:

a latch assembly connected to said fuselage and said cargo door for movement between a latched position, wherein said cargo door is in a closed position, and an unlatched position, wherein said cargo door is in an open position;

a locking assembly connected to said cargo door for movement between a locked position, wherein said latch assembly is maintained in said latched position by a locking pin, and an unlocked position, wherein said latch assembly may move to the unlatched position;

a blocker assembly connected to said cargo door for movement between a blocked position, wherein said blocker assembly positively stops said locking and latch assemblies from moving to said unlocked and unlatched positions, respectively, and an unblocked position, wherein said blocker assembly is disengaged from said locking and latch assemblies, allowing said locking and latch assemblies to move to said unlocked and unlatched positions, respectively;

an actuator coupled to said blocker assembly for actuating said blocker between said blocked and said unblocked positions;

a vent door mounted adjacent an opening in said aircraft fuselage wherein said opening and said vent door are remote from said cargo door, and said vent door movable between a vent door closed position, wherein said adjacent opening is sealably closed, and a vent door open position, wherein said adjacent opening is open;

means for biasing said vent door toward said vent door open position; and said actuator coupled to said vent door for actuating said vent door between said vent door closed position and said vent door open position simultaneously with the actuation of said blocker assembly between said blocked and unblocked positions, respectively.

2. The aircraft vent and cargo door locking mechanism stated in claim 1, wherein said latch assembly further comprises:

a plurality of latches adjacently mounted along one side of said cargo door and along an opposing surface of said fuselage for latching and unlatching said cargo door to said fuselage;

a torque tube rotatably connected to said cargo door and operatively connected to each of said plurality of latches; and means for rotating said torque tube between said latched position and said unlatched position.

3. The aircraft vent and cargo door locking mechanism stated in claim 1, wherein said locking assembly further comprises:

a gang bar slideably mounted on said cargo door for movement between said locked position and said unlocked position;

a plurality of swivel arm assemblies pivotally connected to said gang bar and operatively connected to said latch assembly; and means for moving said gang bar between said locked and unlocked positions wherein said swivel arm assemblies move with said gang bar to lock and unlock, respectively, said latch assembly.

4. The aircraft vent and cargo door locking mechanism as stated in claim 3, further comprising:

a lock block connected to said gang bar; and said blocker assembly engaging said lock block in said locked position to prohibit said gang bar from moving toward said unlocked position.

5. The aircraft vent and cargo door locking mechanism as stated in claim 1, further comprising:

an indicator connected to said cargo door for indicating whether said locking assembly is in said locked position or said unlocked position.

6. The aircraft vent and cargo door locking mechanism stated in claim 1, wherein said actuator further comprises:

a handle pivotally mounted to said cargo door;

at least one first push/pull cable pivotally connected to said handle and operatively connected to said blocker assembly for moving said blocker assembly between said blocked and unblocked positions in response to the rotation of said handle; and a second push/pull cable pivotally connected to said handle and operatively connected to said vent door for moving said vent door between said vent door closed position and said vent door opened position in response to the rotation of said handle.

7. The aircraft vent and cargo door locking mechanism as stated in claim 6, wherein said handle further comprises:

an interior lever located in the interior of the fuselage and having said first and second push/pull cables pivotally connected thereto;

a cylinder connected to said interior lever and extending through said cargo door to the exterior of said fuselage; and an exterior lever connected to said cylinder and located on the exterior of the fuselage for actuating said actuator from outside said fuselage.

8. The aircraft vent and cargo door locking mechanism as stated in claim 7, further comprising:

a spring mounted on said cylinder between said interior lever and an interior wall of said cargo door; and a plate mounted to the exterior of said cargo door, and said plate having a slot for receiving and maintaining said exterior lever in said locked position when said vent door is in said vent door closed position.

9. The aircraft vent and cargo door locking mechanism as stated in claim 1, wherein said biasing means further comprises:

at least one tension spring connected to said fuselage and said vent door for biasing said vent door toward said vent door open position.

10. An aircraft vent and cargo door locking mechanism for ensuring the opening, closing, and locking of a cargo door in a cargo door opening formed in an aircraft fuselage, comprising:

a latch assembly connected to said fuselage and said cargo door for movement between a latched position, wherein said cargo door is in a closed position, and an unlatched position, wherein said cargo door may move to an open position;

a locking assembly connected to said cargo door for movement between a locked position, wherein said latch assembly is maintained in said latched position by a locking pin, and an unlocked position, wherein said latch assembly may move to the unlatched position;

a blocker connected to said cargo door for movement between a blocked position, wherein said blocker positively stops said locking and latch assemblies from moving to said unlocked position and said unlatched position, respectively, and an unblocked position, wherein said blocker is disengaged from said locking and latch assemblies allowing said locking and latch assemblies to move to said unlocked and unlatched positions, respectively;

a vent door mounted adjacent an opening in said aircraft fuselage wherein said opening and said vent door are remote from said cargo door, and said vent door movable between a vent door closed position, wherein said adjacent opening is sealedly closed by said vent door, and a vent door open position, wherein said adjacent opening is not closed by said vent door;

at least one tension spring connected to said vent door and said fuselage for biasing said vent door toward vent door open position;

an actuator handle pivotally connected to said cargo door;

at least one first push/pull cable pivotally connected to said actuator handle and operatively connected to said blocker wherein said first push/pull cable is responsive to the rotation of said actuator handle by moving said blocker between said blocked and unblocked positions; and a second push/pull cable pivotally connected to said actuator handle and operatively connected to said vent door wherein said second push/pull cable is responsive to the rotation of said actuator handle by moving said vent door between said vent door open and closed positions.

11. The aircraft vent and cargo door locking mechanism as stated in claim 10, further comprising:
an electronic sensor for sensing and signaling whether said blocker is in said blocked or unblocked position.

12. The aircraft vent and cargo door locking mechanism stated in claim 10, wherein said locking assembly further comprises:
a gang bar slideably mounted on said cargo door for movement between said locked position and said unlocked position;
a plurality of swivel arm assemblies pivotally connected to said gang bar and operatively connected to said latch assembly; and
a linear actuator connected to said cargo door and operatively connected to said gang bar for moving said gang bar between said locked and unlocked positions, wherein said swivel arm assemblies move with said gang bar to lock and unlock, respectively, said latch assembly.

13. The aircraft vent and cargo door locking mechanism as stated in claim 10, further comprising:
an electronic sensor mounted to said cargo door for sensing and signaling whether said locking assembly is in said locked position or said unlocked position.

14. The aircraft vent and cargo door locking mechanism as stated in claim 10, wherein said latch assembly further comprises:
a plurality of latches adjacently mounted along one side of said cargo door and an opposing surface of said fuselage for latching said cargo door to said fuselage;
a torque tube rotatably connected to said cargo door and operatively connected to each of said plurality of latches; and
a linear actuator connected to said cargo door and operatively connected to said torque tube for rotating said torque tube between said latched position and said unlatched position.

15. The aircraft vent and cargo door locking mechanism as stated in claim 14, further comprising:
said gang bar having a lock block connected to and extending outwardly from said gang bar; and
said blocker engaging said lock block in said latched position to prohibit said lock block and said gang bar from retracting toward said unlatched position.

16. The aircraft vent and cargo door locking mechanism as stated in claim 10, wherein said actuator handle further comprises:
an interior lever located in the interior of the fuselage and having said first and second push/pull cables pivotally connected thereto;
a cylinder connected to said interior lever and extending through said cargo door to the exterior of said fuselage; and
an exterior lever connected to said cylinder for actuating said actuator from outside said fuselage.

17. The aircraft vent and cargo door locking mechanism as stated in claim 16, further comprising:
a compression spring mounted on said cylinder between said interior lever and an interior wall of said cargo door; and
a plate mounted to the exterior of said cargo door, and said plate having a slot for receiving and maintaining said exterior lever in said locked position when said vent door is in said vent door closed position.

18. A aircraft vent and cargo door locking mechanism for ensuring the opening, closing, and locking of a cargo door opening formed in an aircraft fuselage, comprising:
a latch assembly connected to said fuselage and said cargo door for movement between a latched position, wherein said cargo door is in a closed position, and an unlatched position, wherein said cargo door may move to the open position;

a locking assembly connected to said cargo door for movement between a locked position, wherein said latch assembly is maintained in said latched position by a locking pin, and an unlocked position wherein said latch assembly may move to said unlatched position;

a blocker connected to said cargo door for movement between a blocked position, wherein said blocker positively stops said locking and latch assemblies from moving from said locked and latched positions to said unlocked and unlatched positions, respectively, and an unblocked position, wherein said blocker is disengaged from said locking and latch assemblies allowing said locking and latch assemblies to move to said unlocked and unlatched positions, respectively;

a vent door mounted adjacent an opening in said aircraft fuselage wherein said opening and said vent door are remote from said cargo door, and said vent door movable between a vent door closed position, wherein said adjacent opening is sealedly closed by said vent door, and a vent door open position, wherein said adjacent opening is not closed by said vent door;

at least one tension spring connected to said fuselage and said vent door for biasing said vent door toward said vent door open position;

a cylinder rotatably connected to and extending through said cargo door to the exterior of said fuselage;

an interior lever located in the interior of the fuselage and connected to said cylinder;

an exterior lever connected to said cylinder on the exterior side of said fuselage;

at least one first push/pull cable pivotally connected to said interior lever and operatively connected to said blocker for moving said blocker between said blocked and unblocked positions in response to the rotation of said interior and exterior lever; and a second push/pull cable pivotally connected to said interior lever and operatively connected to said vent door for moving said vent door between said vent door open and closed positions in response to rotation of said interior and exterior lever.

19. The aircraft vent and cargo door locking mechanism as stated in claim 18, wherein said latch assembly further comprises:

a plurality of latches adjacently mounted along one side of said cargo door and an opposing surface of said fuselage for latching said cargo door to said fuselage;

a torque tube rotatably connected to said cargo door and operatively connected to each of said plurality of latches; and a hydraulic cylinder connected to said cargo door and operatively connected to said torque tube for rotating said torque tube between said latched and unlatched positions.

20. The aircraft vent and cargo door locking mechanism as stated in claim 19, wherein said locking assembly further comprises:

a gang bar slideably mounted on said cargo door for movement between said locked position and said unlocked position;

a plurality of swivel arm assemblies pivotally connected to said gang bar and operatively connected to said latch assembly; and means for moving said gang bar between said locked and unlocked positions wherein said swivel arm assemblies move with said gang bar to lock and unlock, respectively, said latch assembly.

21. The aircraft vent and cargo door locking mechanism as stated in claim 20, further comprising:

a pair of adjacently spaced limit switches mounted to said cargo door to sense whether said gang bar is in said locked position or said unlocked position, and said limit switches providing a signal to indicate whether said gang bar is in said locked or unlocked position.

22. The aircraft vent and cargo door locking mechanism as stated in claim 19, further comprising:

a lock block connected to said gang bar; and said blocker engaging said lock block in said locked position to prohibit said gang bar from moving toward said unlocked position.

23. The aircraft vent and cargo door locking mechanism as stated in claim 18, further comprising:

a compression spring mounted on said cylinder between said interior lever and an interior wall of said cargo door; and a plate mounted to the exterior of said cargo door, and said plate having a slot for receiving and maintaining said exterior lever in said locked position when said vent door is in said vent door closed position, and said slot providing an indicator that said vent door is in said vent door closed position.

24. The aircraft vent and cargo door locking mechanism as stated in claim 18, further comprising:

a limit switch mounted adjacent said blocker for determining and signaling whether said blocker is in said blocked or unblocked position.

* * * * *